No. 775,364. PATENTED NOV. 22, 1904.
R. D. GALLAGHER, Jr.
COLLAPSIBLE GLOBE.
APPLICATION FILED FEB. 12, 1904.
NO MODEL.
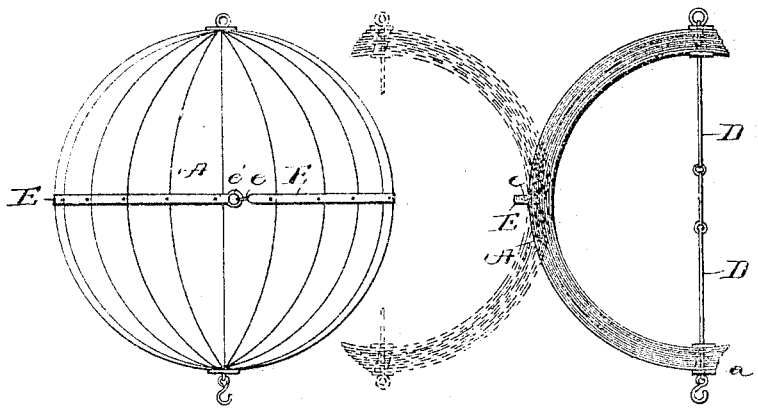
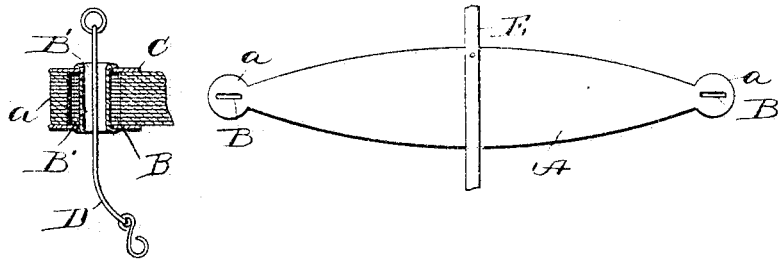
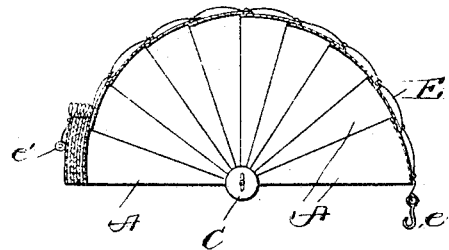
Witnesses
Inventor
Richard D. Gallagher Jr.
by Alexander Stuart
his Attorney No. 775,364.  Patented November 22, 1904.

UNITED STATES PATENT OFFICE.

RICHARD D. GALLAGHER, JR., OF NEW YORK, N. Y.

COLLAPSIBLE GLOBE.

SPECIFICATION forming part of Letters Patent No. 775,364, dated November 22, 1904.

Application filed February 12, 1904. Serial No. 193,261. (No model.)

*To all whom it may concern:*

Be it known that I, RICHARD D. GALLAGHER, Jr., a citizen of the United States, residing at New York, in the county of New York and State of New York, have invented certain new and useful Improvements in Collapsible Globes; and I do hereby declare the following to be a full, clear, and exact description of the same, reference being had to the accompanying drawings, forming a part of this specification, and to the letters of reference marked thereon.

The objects of this invention are to provide a folding or collapsible globe or sphere which when appropriately delineated will answer for educational, advertisement, or amusement purposes and which when folded or collapsed will be flat and of convenient shape for storage, shipment, or even mailing in an ordinary envelop.

The invention consists in a series of lens-shaped gores pivotally joined at their ends and capable of being bent into semicircular form to bring the pivots at the opposite ends of the gores into substantial alinement to constitute the poles of the globe, which latter is formed by properly distributing the gores around an axis passing through the pivots.

The invention further consists in certain novel details of construction and combinations and arrangements of parts, all as will be now described, and pointed out particularly in the appended claims.

In the accompanying drawings, Figure 1 is a side elevation of a globe embodying the present improvements. Fig. 2 is a similar view showing the gores with the pivots in alinement, but before they are distributed to form the globe. Fig. 3 is a detail of the pivoted connection at one end of the gores. Fig. 4 is a plan of one of the gores. Fig. 5 is a section showing one means for distributing and spacing the gores.

Like letters of reference in the several figures indicate the same parts.

In accordance with the present invention a series of lens-shaped gores A are provided, each preferably having end enlargements $a$ and sufficient in number to form the circumference of a sphere where the ends are held together and the bodies properly distributed. Obviously the gores may be distributed so that they slightly overlap, as shown in Fig. 5, and the number of gores is optional, a relatively large number, however, being preferably employed, inasmuch as they will present a more truly spherical surface than a smaller number, especially when made flat.

The preferred manner of assembling the gores is to provide each with an elongated opening B in the enlarged end, or, as I shall term it, "polar enlargement," and pass an eyelet B' loosely through the openings in the several gores, a washer, such as C, preferably of a diameter equal to the polar enlargements of the gores, being placed on both sides.

The gores may be bent as a body into a semicircle and while held in such position if they be distributed around the axes formed by the pivots the result will be a globe. To facilitate the distribution, it is preferred to pass a retainer through the pivots, and this retainer may conveniently take the form of a cord or cords D, one at each end, and provided on opposite ends with rings and hooks adapted to be caught together, as indicated in Fig. 2, when the distribution of the gores becomes a simple matter.

If the inner gore be held and the outer one drawn around the axis, the gores will naturally distribute themselves as indicated in Fig. 5; but to insure registration of the delineations it is preferred to employ some means for limiting the movement of adjacent gores—such, for instance, as a cord or tape E—which may be attached to each gore in succession and the ends provided with fastening means, such as a hook and ring $e\ e'$.

By providing the gores with oblong openings in the ends and eyelets or pivots B' of less diameter than the length of the openings B (see Fig. 3) it will be seen that they may open out flat, as in Fig. 3, or be curved, as in Fig. 2, with either face outwardly, the reverse position being shown by the dotted lines. This adaptability permits the globe to have two available surfaces upon which different subjects may be delineated, and at the same time when collapsed the whole structure is flat and may be readily packed, carried, or shipped in an ordinary envelop.

It is preferred to form the gores of thin tough material, such as celluloid, and in some instances it may be desirable to dish the gores, so as to present true spherical segments, (see Fig. 5;) but the dishing will be slight in each individual gore, and owing to the elasticity of the material the gores may be readily sprung, so as to bulge on either side. In fact, the bending into semicircular form preliminary to the distribution of the gores will of itself spring the gores properly to form the spherical surface.

Where reference is made herein to substantially flat gores, it is intended to include gores slightly dished for the purpose stated.

Having thus described my invention, what I claim as new, and desire to secure by Letters Patent, is—

1. A collapsible globe formed of substantially flat gores pivotally united at the ends and adapted to be distributed on an axis formed by bringing the pivots into substantial alinement; substantially as described.

2. A collapsible globe formed of gores having elongated slots in their ends and pivotal connections passing through said slots, said gores being adapted to be distributed about an axis formed by bringing the pivots into substantial alinement; substantially as described.

3. A collapsible globe formed of substantially flat lens-shaped gores, pivotal connections between the gores at the ends and means whereby said gores will be held in spherical form when distributed about an axis common to both pivots; substantially as described.

4. A collapsible globe formed of substantially flat gores having polar enlargements, pivots passing through said enlargements and washers at the ends of said pivots, whereby when said gores are bent to bring the pivots into alinement they may be distributed about the axis common to the pivots and form a globe; substantially as described.

5. A collapsible globe formed of reversible gores pivotally connected at the ends by pivots extending transversely of the gores and adapted to be brought into alinement by bending the gores in either direction; substantially as described.

6. A collapsible globe formed of reversible gores having registering openings in their ends, pivots passing through said openings and of less diameter than the largest dimension of the openings whereby the gores may be bent in either direction to bring the pivots into alinement; substantially as described.

7. A collapsible globe formed of a series of superposed substantially flat gores having registering apertures in their ends, pivots passing through said apertures and of less diameter than the apertures and means for holding the pivots in substantial alinement when the gores are bent into semicircular form; substantially as described.

RICHARD D. GALLAGHER, JR.

Witnesses:
A. HAMILTON COOKE,
A. W. TAYLOR.